(12) United States Patent
Xiao

(10) Patent No.: US 12,153,930 B2
(45) Date of Patent: Nov. 26, 2024

(54) FORWARD TENSOR AND ACTIVATION SCALING FOR LOWER PRECISION NEURAL NETWORKS

(71) Applicant: Advanced Micro Devices, Inc., Santa Clara, CA (US)

(72) Inventor: Hai Xiao, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 199 days.

(21) Appl. No.: 17/565,391

(22) Filed: Dec. 29, 2021

(65) Prior Publication Data

US 2023/0205544 A1  Jun. 29, 2023

(51) Int. Cl.
| | |
|---|---|
| *G06F 9/30* | (2018.01) |
| *G06F 9/355* | (2018.01) |
| *G06F 9/38* | (2018.01) |
| *G06F 18/214* | (2023.01) |
| *G06N 3/04* | (2023.01) |
| *G06N 3/048* | (2023.01) |
| *G06N 3/063* | (2023.01) |
| *G06N 3/08* | (2023.01) |
| *G06N 3/084* | (2023.01) |

(52) U.S. Cl.
CPC .......... *G06F 9/3887* (2013.01); *G06F 9/3555* (2013.01); *G06F 18/214* (2023.01); *G06N 3/04* (2013.01); *G06N 3/048* (2023.01); *G06N 3/063* (2013.01); *G06N 3/08* (2013.01); *G06N 3/084* (2013.01)

(58) Field of Classification Search
CPC .... G06F 9/3887; G06F 9/3555; G06F 18/214; G06N 3/04; G06N 3/048; G06N 3/063; G06N 3/08; G06N 3/084; G06N 3/045
See application file for complete search history.

(56) References Cited

U.S. PATENT DOCUMENTS

| | | | | |
|---|---|---|---|---|
| 11,635,941 | B2 * | 4/2023 | Terasaki | G06F 7/5443 |
| | | | | 706/41 |
| 2017/0270408 | A1 * | 9/2017 | Shi | G06N 3/08 |
| 2018/0046900 | A1 * | 2/2018 | Dally | G06N 3/082 |
| 2018/0322382 | A1 * | 11/2018 | Mellempudi | G06F 5/012 |
| 2021/0064985 | A1 * | 3/2021 | Sun | G06F 7/5443 |

* cited by examiner

*Primary Examiner* — Corey S Faherty
(74) *Attorney, Agent, or Firm* — Volpe Koenig

(57) ABSTRACT

A processing device is provided which comprises memory configured to store data and a processor configured to execute a forward activation of the neural network using a low precision floating point (FP) format, scale up values of numbers represented by the low precision FP format and process the scaled up values of the numbers as non-zero values for the numbers. The processor is configured to scale up the values of one or more numbers, via scaling parameters, to a scaled up value equal to or greater than a floor of a dynamic range of the low precision FP format. The scaling parameters are, for example, static parameters or alternatively, parameters determined during execution of the neural network.

28 Claims, 4 Drawing Sheets

FORWARD TENSOR AND ACTIVATION SCALING FOR LOWER PRECISION NEURAL NETWORKS

BACKGROUND

Machine learning (e.g., deep learning) is widely used in a variety of technologies (e.g., image classification, nature language processing, and other technologies) to make predictions or decisions to perform a particular task (e.g., whether an image includes a certain object). Neural networks are a class of deep learning algorithms used in machine learning applications. These networks typically include multiple layers. At each layer, a set of filters (convolution and/or non-linearity) are applied to the output of previous layer, and the outputs of each layer are known as activations or feature maps. The first and last layers in a network are known as the input and output layers, respectively, and the layers in between the first and last layers are typically known as hidden layers.

Neural networks are trained in order to make predictions or decisions to perform a particular task (e.g., whether an image includes a certain object). During training, a neural network model is exposed to different data. At each layer, the model transforms the data and receives feedback regarding the accuracy of its operations. During an inference stage, the trained neural network model is used to infer (i.e., as inference) or predict outputs on testing samples (e.g., input tensors).

BRIEF DESCRIPTION OF THE DRAWINGS

A more detailed understanding can be had from the following description, given by way of example in conjunction with the accompanying drawings wherein.

DETAILED DESCRIPTION

Figure 1:
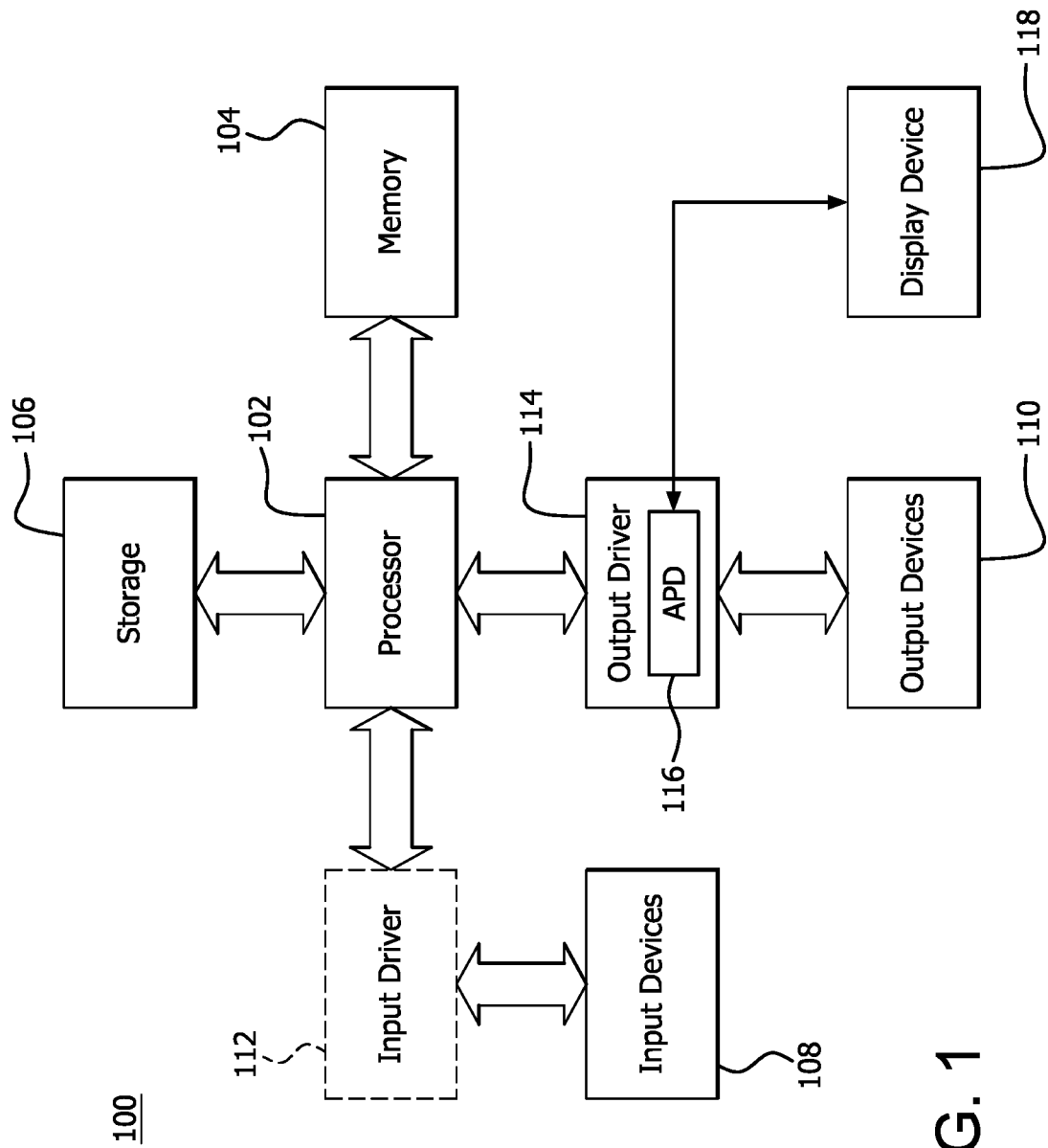
FIG. 1 is a block diagram of an example device in which one or more features of the disclosure can be implemented.

As used herein, programs include sequences of instructions to be executed using one or more processors to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems. Processors may include, for example, multiple processing cores (e.g., compute units (CUs)) each of which are configured to read and execute program instructions, such as instructions to execute a method of executing a neural network Floating point (FP) numbers are frequently used in neural networks to approximate the value of numbers (e.g., numbers in input, tensor prior to activation). The precision and accuracy of a neural network depends on the FP format used to represent numerical values used by the neural network. Precision is reflected by a number of bits used to represent a number. Accuracy, in a neural network, refers to a level of correctness of a model's prediction (e.g., a ratio of a number of correct predictions to a total number of predictions).

Higher precision formats can represent a larger dynamic range of numbers with higher resolution than lower precision formats. When a non-zero number (e.g., value between binary 0 and binary 1), represented by an FP format, falls below the floor (i.e., minimal absolute value) of the dynamic range of the FP format, the number is determined as having a value of zero (i.e., vanishing activation), which contributes to inaccuracy of the network. Accordingly, the larger dynamic range and higher resolution of higher precision formats decreases the number of false positives and false negatives (i.e., more precise). However, higher precision formats increase the amount of time, bandwidth, and power used to achieve accurate results compared to lower precision FP formats.

On the other hand, lower precision FP formats typically process inputs more quickly, use less memory and consume less power than higher precision FP formats. However, because lower precision formats can represent a smaller dynamic range of numbers and with lower resolution than higher precision formats, lower precision FP formats typically produce less accurate results than higher precision FP formats, which may not be tolerable for some neural network applications (e.g., applications which benefit from more accurate object detection and classification, such as object detection in computer vision applications such as those applications in the medical field).

For example, IEEE FP32 single precision format (hereinafter FP32 precision format) uses 1 bit to represent the sign, 8 bits to represent the exponent and 23 bits to represent the mantissa. When FP32 precision format is used, there is no need for data loss scaling during backward propagation (i.e., gradient scaling) or scaling during forward propagation to improve accuracy.

IEEE FP16 half-precision format (hereinafter FP16 precision format) uses 1 bit to represent the sign, 5 bits to represent the exponent and 10 bits to represent the mantissa. When FP16 precision format is used during the training stage of a neural network, data loss scaling (i.e., multiplying a number-a loss term by another number) during backward propagation is introduced to accommodate a smaller numeric dynamic range (i.e., 5-bit exponent can represent a smaller range of numbers than an 8-bit exponent) and capture possible vanished gradients (i.e., error terms) outside of the range to improve accuracy. Data loss scaling is not needed for the trained FP16 precision neural network during the inference stage. Accordingly, FP16 precision format and mixed precision formats (e.g., FP16 precision format and FP32 precision format) are useful for training neural networks to provide an expected accuracy.

For lower precision formats (e.g., FP8 precision format or lower), these conventional techniques (e.g., data loss scaling) are not able to train neural networks to converge to a comparable level accuracy as compared to training using higher precision formats. For example, FP8 precision format can use 1 bit to represent the sign, 4 bits to represent the exponent and 3 bits to represent the mantissa (i.e., 1-4-3). That is, FP8 precision format includes an even smaller numeric dynamic range (i.e., 4-bit exponent) than the dynamic range (i.e., 5-bit exponent) of FP16 precision format to represent numbers used by the neural network.

Conventional techniques (e.g., data loss scaling) are not able to train neural networks to compensate for the smaller numeric dynamic range of FP8 precision format. For example, while loss scaling helps to address the vanish gradient from error during backward propagation, loss scaling is not a better representation of the errors and does not account for degraded and inaccurate data occurring during forward propagation (i.e., input, tensor, activation) due to the lower precision.

Due to the smaller dynamic range of the FP8 format, even with a configurable exponent bias setting (e.g., a configurable exponent bias setting for a silicon chip), numbers having values closer to zero are more likely to be determined as a zero number, contributing to the inaccuracy of the neural network.

Features of the present disclosure provide methods and devices which efficiently train neural networks by scaling (e.g., scaling up) numbers represented by lower precision FP formats (e.g., FP8 or FP4 format) during forward propagation.

Features of the present disclosure improve the accuracy of the neural network by reducing the amount of numbers, represented by the lower precision FP format during forward propagation (i.e., forward activation), that fall below the floor (i.e., minimum absolute value) of the dynamic range of the lower precision FP format. That is, numbers represented by the lower precision FP format are scaled (e.g., scaling up) via a scaling factor (i.e., scaling parameter) and scaling operator such that a larger amount of the numbers, represented by the lower precision FP format during forward propagation, are equal to or greater than the minimum absolute value of the dynamic range of the lower precision FP format.

Because the numbers represented by the lower precision FP format during forward propagation are scaled up, the probability of a number falling below the minimum value of the dynamic range is reduced. Accordingly, a larger amount of numbers having non-zero values are not incorrectly determined as having a value of zero (e.g., rounded down to 0), which avoids the non-zero numbers being prematurely ignored for later use during execution of the neural network.

The numbers represented by the lower precision FP format are scaled according to scaling parameters. The scaling parameters are, for example, static scaling parameters. Alternatively, the scaling parameters are dynamically determined during training of the neural network.

One or more scaling parameters P are applied to target tensor value X via a scaling operator Op. The scaling operator Op is, for example, in the form of multiplication (e.g., a multiplier) or any other associative operation which increases the value of a number and increases the probability that the value of the number is equal to or greater than the floor of the dynamic range and is determined as a non-zero number.

Features of the present disclosure can be implemented using loss scaling as well as without using loss scaling.

A processing device for executing a neural network is provided which comprises a processor configured to execute a forward activation of the neural network using a low precision FP format, scale up values of numbers represented by the low precision FP format and process the scaled up values of the numbers as non-zero values for the numbers. The neural network can also comprise a memory configured to store data.

A method of processing a neural network is provided which comprises executing a forward activation of the neural network using a low precision FP)format, scaling up values of numbers represented by the low precision FP format and processing the scaled up values of the numbers as non-zero values for the numbers.

A non-transitory computer readable medium is provided which comprises instructions for causing a computer to execute a method of processing a neural network. The instructions comprise executing a forward activation of the neural network using a low precision FP format, scaling up values of numbers represented by the low precision FP format; and processing the scaled up values of the numbers as non-zero values for the numbers.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU, or Accelerator ASIC or SoC. In various alternatives, the memory 104 is located on the same die as the processor 102, or is located separately from the processor 102. The memory 104 includes a volatile or non-volatile memory, for example, random access memory (RAM), including dynamic RAM (DRAM) and static RAM (SRAM). The RAM includes for example, cache memory, scratchpad memory and registers.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Features of the present disclosure are described herein using CUs as an example of processor cores. CUs include one or more single instruction, multiple data (SIMD) units that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit includes sixteen lanes, where each lane executes the same instruction at the same time as the other lanes in a SIMD unit but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. The parallelism afforded by CUs is suitable for executing neural networks and matrix multiplication, such as for example, matrix multiplication used in graphics related operations such as pixel value calculations, vertex transformations, and other graphics operations.

Figure 2:
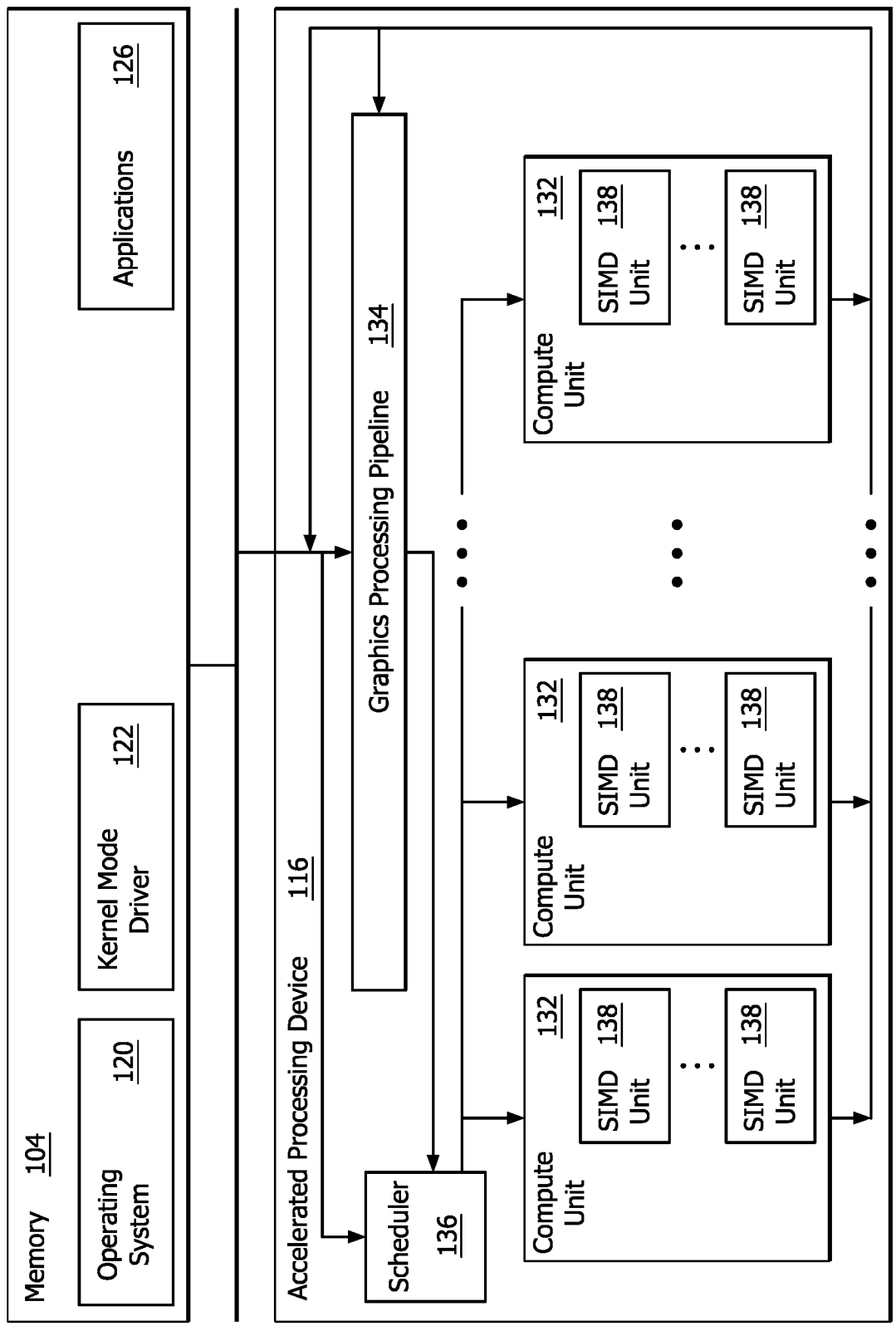
FIG. 2 is a block diagram illustrating exemplary components of a processor in which one or more features of the disclosure can be implemented.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134. For example, compute units 132 and SIMD instructions can be used to perform computation tasks for machine learning (e.g., deep learning), including training neural networks and using trained neural networks to infer (inference) or predict outputs on input tensors. The compute units 132 are also used to determine the values of FP numbers and scale FP numbers represented by different precision FP formats as described in more detail herein. An application 126 or other software executing on the processor 102 transmits programs that define such computation tasks to the APD 116 for execution.

As described above, for lower precision formats (e.g., FP8 precision format or lower), conventional techniques (e.g., data loss scaling) are not able to train neural networks to converge to an accuracy as compared to training with higher precision formats. For example, FP8 precision format includes a smaller numeric dynamic range (i.e., 4-bit exponent) than the dynamic range (i.e., 5-bit exponent) of FP16 precision format to represent numbers used by the neural network.

Conventional techniques (e.g., data loss scaling) are not able to train neural networks to compensate for smaller numeric dynamic ranges (e.g., the smaller dynamic range of the FP8 precision format). For example, while loss scaling addresses the vanish gradient from error during backward propagation, loss scaling is not a better representation of the errors and does not account for degraded and inaccurate data occurring during forward propagation (i.e., input, tensor, activation) due to the lower precision.

Due to the smaller dynamic range of the FP8 format, even with a configurable exponent bias setting (e.g., a configurable exponent bias setting of silicon chip), numbers having values closer to zero are more likely not large enough to be determined as a non-zero number, contributing to the inaccuracy of the neural network.

Features of the present disclosure provide techniques which improve accuracy of neural networks by scaling (e.g., scaling up) numbers represented by lower precision FP formats (e.g., FP8, FP4 format) during forward the activation stage of the neural networks.

Figure 3:
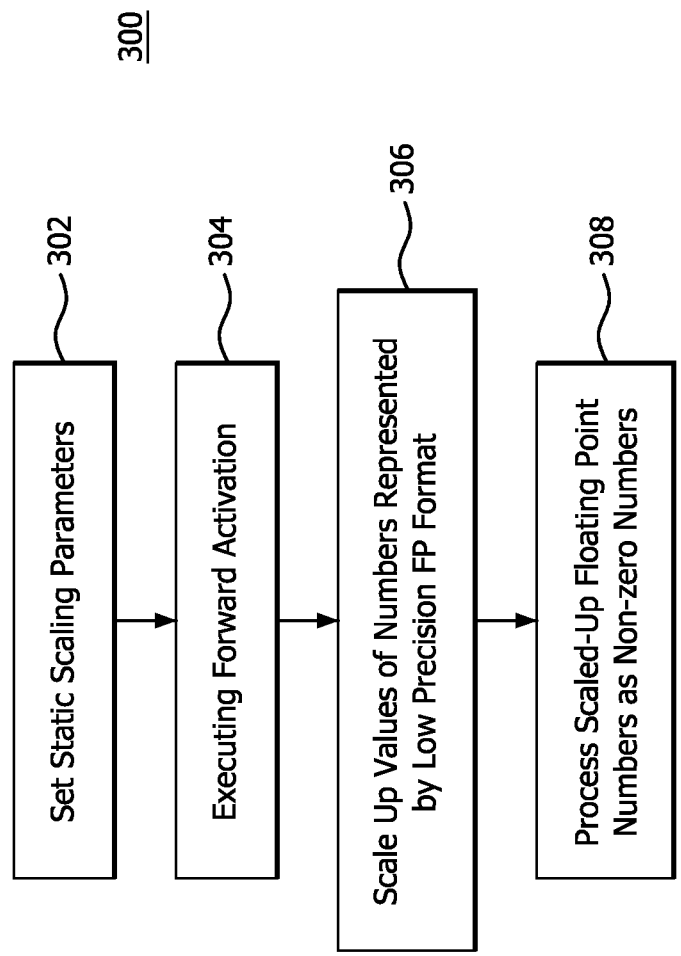
FIG. 3 is a flow diagram illustrating an example method of forward tensor and activation scaling for a lower precision neural network using static scaling parameters according to features of the disclosure.

FIG. 3 is a flow diagram illustrating an example method 300 of forward tensor and activation scaling for a lower precision neural network using static scaling parameters according to features of the disclosure. The method 300 can be implemented during both the training stage and inference stage of the neural network.

As shown at block 302, the method 300 includes setting the static scaling parameters. That is, the scaling parameters in the embodiment of method 300 are predetermined (i.e., determined prior to execution of the neural network) according to various factors (e.g., particular technology or application, such as image classification and nature language processing configurations, etc.)

As shown at block 304, the method 300 includes executing a forward activation of the neural network using a low precision FP format.

For example, during forward activation, the outputs (i.e., activation tensors) are written to and read from memory for each layer, or a plurality of layers, depending on the particular application. The activations tensors are subject to an operation defined by the layer (e.g., convolution kernel, pooling operation), which results in new activation tensors for the next layer.

As described above, loss scaling is used to mitigate gradient drop during the backward propagation stage, but does not account for degraded and inaccurate data occurring during the forward activation stage (i.e., input, tensor, activation) due to the lower precision (i.e., the smaller dynamic range) of the FP format.

As shown at block 306, the method 300 includes scaling up values of numbers represented by the low precision FP format.

Numbers represented in a lower precision FP format are, for example, scaled (e.g., scaling up) via a scaling factor (i.e., scaling parameter P) and scaling operator Op such that a larger amount of the numbers, represented by the lower precision FP format during forward propagation, are equal to or greater than the minimum absolute value of the dynamic range of the lower precision FP format.

For example, if an FP8 (1-4-3) precision format, with an exponent bias equal to 7, is used as the FP format, the minimum value of the dynamic range used to represent a number is approximately 0.01563. Accordingly, each number (i.e., number having a value between binary 0 and binary 1) having a represented value lower than 0.01563 is determined (e.g., by a processor) as having a value of 0, despite the number having a value between 0 and 0.01563. For example, a number X that is represented with a value of 0.0001 is determined by the processor to have a value of zero (and not 0.0001) because 0.0001 is less than the minimum absolute value 0.01563 of the dynamic range of the FP8 precision format.

One or more scaling parameters P are applied to target tensor value X via a scaling operator Op. The scaling operator Op is, for example, in the form of multiplication (e.g., a multiplier) or any other associative operation which increases the value of a number and the probability that the value of the number is equal to or greater than the floor of the dynamic range. The scaling operator Op is, for example, applied to a tensor value X at input or prior to a non-linear activation function.

The values of numbers for one or more layers of a neural network are scaled up during forward activation (i.e., forward scaling layers) such that a larger amount of the numbers, represented by the lower precision format (e.g., FP8), are equal to or greater than the minimum value of the dynamic range of the lower precision FP format. For example, when the number X represented with a value of 0.0001 is scaled up using a scaling parameter P=20 and a multiplier scaling operator Op (i.e., Op=*), the number is scaled as P*X=0.002, which is greater than the minimum value 0.01563 of the dynamic range of the FP8 (1-4-3) precision format. Accordingly, the value of the number X is determined as a non-zero value. The scaling can be implemented via software, hardware or a combination of software and hardware.

As shown at block 308, the method 300 includes processing the scaled up FP numbers as non-zero numbers. That is, because the numbers represented by the lower precision FP format during forward propagation are scaled up, the probability of a number falling below the minimum value of the dynamic range is reduced. Accordingly, a larger amount of numbers having non-zero values are not determined as having a value of zero (e.g., rounded down to 0), and the scaled up FP numbers (i.e., scaled up values) are processed as non-zero numbers during execution of the neural network. That is, a larger amount of numbers having non-zero values are not prematurely ignored for later use during execution of the neural network.

Figure 4:
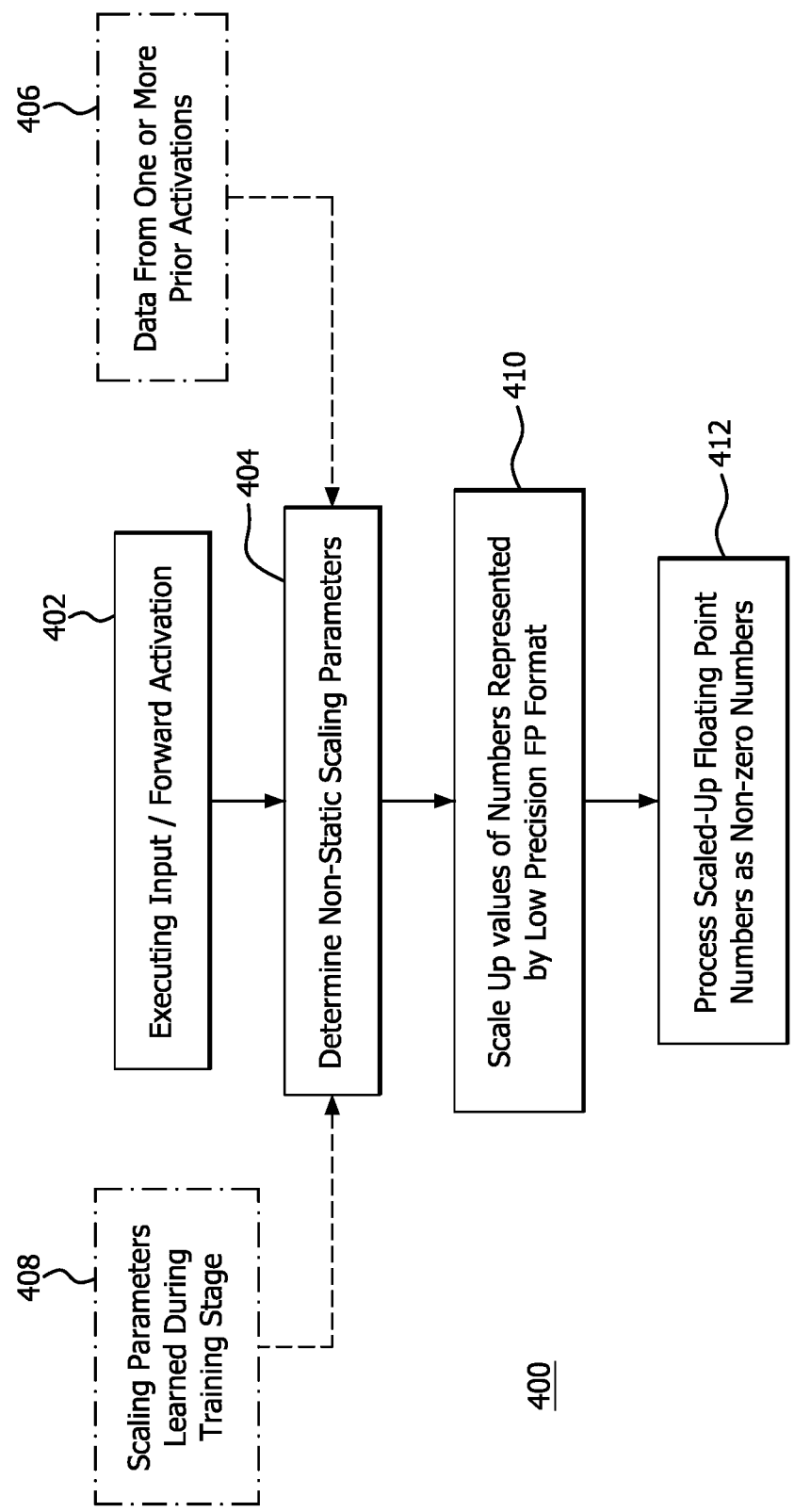
FIG. 4 is a flow diagram illustrating an example method of forward tensor and activation scaling for a lower precision neural network using non-static scaling parameters according to features of the disclosure.

FIG. 4 is a flow diagram illustrating an example method 400 of forward tensor and activation scaling for a lower precision neural network using non-static (i.e., dynamic) scaling parameters according to features of the disclosure. The non-static scaling parameters are, for example, dynamically derived during the training stage and inference stage of the neural network. Alternatively, during the inference stage of the neural network, the non-static scaling parameters are determined from scaling parameters which are learned during the training stage of the neural network.

As shown at block 402, the method 400 includes executing a forward activation of the neural network using a low precision FP format (e.g., FP8 precision format or FP4 precision format) as described above at block 304 in FIG. 3.

As shown at block 404, the method 400 includes determining non-static scaling factors. The non-static scaling parameters are, for example, dynamically determined (e.g., derived) during the training stage and inference stage of the neural network, from data (e.g., inputs and statistical patterns) of prior-activations according to a variety of predetermined heuristics. Alternatively, during the inference stage of the neural network, the non-static scaling parameters are determined from scaling parameters which are learned during the training stage of the neural network.

These alternatives are shown in FIG. 4 via dashed lines. For example, data (e.g., inputs and statistical patterns) of prior-activations according to a variety of predetermined heuristics, at block 406, are used to dynamically derive the scaling parameters during the training stage and inference stage of the neural network.

Alternatively, scaling parameters that are learned during the training stage, at block 408, are used as the scaling parameters during the inference stage of the neural network.

As shown at blocks 410 and 412, similar to blocks 306 and 308 of FIG. 3 described above, the method 400 includes scaling up values of numbers represented by the low precision FP format using the non-static parameters and processing the scaled up FP numbers as non-zero numbers.

The accuracy of the neural network is improved by reducing the amount of numbers, represented by the lower precision FP format during forward propagation (i.e., forward activation), that fall below the floor (i.e., minimum value) of the dynamic range of the lower precision FP format.

Typically, the numbers of some non-linear activation functions (e.g., Sigmoid function, tanh (hyperbolic tangent) function and some rectified linear unit (ReLU6) activation function) are performed after tensor numbers X are already saturated by a number less than a maximum value of the dynamic range of the FP8 precision format. Accordingly, the static and non-static scaling parameters are used to scale up numbers having smaller values (i.e., smaller absolute values) into the range of lower precision representation, to avoid the numbers having smaller values from being prematurely ignored (i.e., treated as zero values) during execution of the neural network.

The scaled up larger numbers from original tensor (or input) numbers X are maintained in the dynamic range of the lower precision representation, either by using techniques such as parametric clipping or a non-linear squeeze/scaling in which larger numbers are scaled less than smaller numbers.

Scaling factors and scaling operators (additive, multiplicative or other operator) are determined using one or more factors. For example, scaling factors and scaling operators are determined according to a particular application.

Additionally, or alternatively, scaling factors and scaling operators are determined according to a type of transformation used during execution of the neural network, such as a linear transformation (e.g., affine transformations in the form of $X=a*X+b$, where a and b are vectors) or a non-linear transformation, such as for example a logarithmic transformation (e.g., $X=\log(\text{shift\_normalize}(X))$, where $\text{shift\_normalize}(X)>0$) to achieve the desired results.

Both linear and non-linear scaling can be configuration based (predetermined scaling operators/factors) or learning based (scaling operators/factors determined during training). Both linear and non-linear scaling can be performed on a coarse granularity (same scaling operator/factor for each layer) or fine granularity (the scaling operator/factor is determined/selected per layer).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device for executing a neural network comprising:
   one or more processors collectively configured to:
   execute a forward activation of the neural network using a low precision floating point (FP) format;
   scale up values of numbers represented by the low precision FP format to form scaled up values by applying scaling parameters derived from learned scaling parameters, wherein the learned scaling parameters are obtained during a training stage of the neural network; and
   process the scaled up values of the numbers as non-zero values for the numbers.

2. The processing device according to claim 1, wherein the one or more processor are further collectively configured to:
   perform loss scaling during backward propagation in the neural network.

3. The processing device according to claim 1, wherein the low precision FP format is an FP8 precision format.

4. The processing device according to claim 1, wherein the one or more processors are further collectively configured to:
   scale up the values of one or more of the numbers to a scaled up value equal to or greater than a floor of a dynamic range of the low precision FP format.

5. The processing device according to claim 1, wherein the learned scaling parameters comprise a scaling factor and a scaling operator.

6. The processing device according to claim 1, wherein scaled up numbers are maintained in the dynamic range of the low precision FP format.

7. The processing device according to claim 6, wherein scaled up numbers are maintained by at least one of parametric clipping and non-linear scaling.

8. The processing device according to claim 5, wherein the scaling factor and scaling operator are derived from to a particular neural network application.

9. The processing device according to claim 5, wherein the scaling factor and scaling operator are determined derived in accordance with a type of transformation used during execution of the neural network.

10. The processing device according to claim 9, wherein the type of transformation used during execution comprises one of a linear transformation and a non-linear transformation.

11. The processing device according to claim 1, further comprising a display device,
    wherein information generated from executing the neural network is displayed on the display device.

12. A method of executing a neural network comprising:
    executing a forward activation of the neural network using a low precision floating point (FP) format;

scaling up values of numbers represented by the low precision FP format to form scaled up values by applying, learned scaling parameters, wherein the learned scaling parameters are obtained during a training stage of the neural network; and processing the scaled up values of the numbers as non-zero values for the numbers.

13. The method according to claim 12, further comprising performing loss scaling during backward propagation in the neural network.

14. The method according to claim 12, wherein the low precision FP format is an FP8 precision format.

15. The method according to claim 12, further comprising scaling up the values of one or more of the numbers to a scaled up value equal to or greater than a floor of a dynamic range of the low precision FP format.

16. The method according to claim 12, further comprising scaling up the values of the numbers according to scaling parameters comprising a scaling factor and a scaling operator.

17. The method according to claim 12, wherein scaled up numbers are maintained in the dynamic range of the low precision FP format.

18. The method according to claim 17, wherein scaled up numbers are maintained by at least one of parametric clipping and non-linear scaling.

19. The method according to claim 16, wherein the scaling factor and scaling operator are determined according to a particular neural network application.

20. The method according to claim 16, wherein the scaling factor and scaling operator are determined in accordance with a type of transformation used during execution of the neural network.

21. The method according to claim 20, wherein the type of transformation used during execution comprises one of a linear transformation and a non-linear transformation.

22. A non-transitory computer readable medium comprising instructions for executing a neural network, the instructions when executed by one or more processors cause the one or more processors to collectively execute a method comprising:

executing a forward activation of the neural network using a low precision floating point (FP) format;

scaling up values of numbers represented by the low precision FP format to form scaled up values by applying, learned scaling parameters, wherein the learned scaling parameters are obtained during a training stage of the neural network; and processing the scaled up values of the numbers as non-zero values for the numbers.

23. The non-transitory computer readable medium according to claim 22, wherein the method further comprises
performing loss scaling during backward propagation in the neural network.

24. The non-transitory computer readable medium according to claim 22, wherein the low precision FP format is an FP8 precision format.

25. The non-transitory computer readable medium according to claim 22, wherein the method further comprises
scaling up the values of one or more of the numbers to a scaled up value equal to or greater than a floor of a dynamic range of the low precision FP format.

26. The non-transitory computer readable medium according to claim 22, wherein the learned scaling parameters comprise a scaling factor and a scaling operator.

27. The non-transitory computer readable medium according to claim 26, wherein the scaling factor and scaling operator are derived from to a particular neural network application.

28. The non-transitory computer readable medium according to claim 26, wherein the scaling factor and scaling operator are determined derived in accordance with a type of transformation used during execution of the neural network.

* * * * *